No. 785,308. PATENTED MAR. 21, 1905.
W. HUCH, DEC'D.
A. BAERTL, EXECUTRIX.
PROCESS OF RECOVERING SUGAR FROM MASSE CUITE.
APPLICATION FILED AUG. 27, 1897.

No. 785,308.                                         Patented March 21, 1905.

UNITED STATES PATENT OFFICE.

WILHELM HUCH, OF HELMSTEDT, GERMANY; AUGUSTE BAERTL EXECUTRIX OF SAID WILHELM HUCH, DECEASED.

PROCESS OF RECOVERING SUGAR FROM MASSE-CUITE.

SPECIFICATION forming part of Letters Patent No. 785,308, dated March 21, 1905.

Application filed August 27, 1897. Serial No. 649,756.

*To all whom it may concern:*

Be it known that I, WILHELM HUCH, engineer, a subject of the Emperor of Germany, residing at Helmstedt, in the Empire of Germany, have invented certain new and useful Improvements in Processes for Recovery of Sugar from Masse-Cuite, of which the following is a specification.

The present invention relates to the recovery of sugar from masse-cuite, and has for its object the recovery of practically all the sugar contained therein.

In the accompanying drawings I have illustrated a form of apparatus suitable for carrying out my invention, in which—

Figure 1:
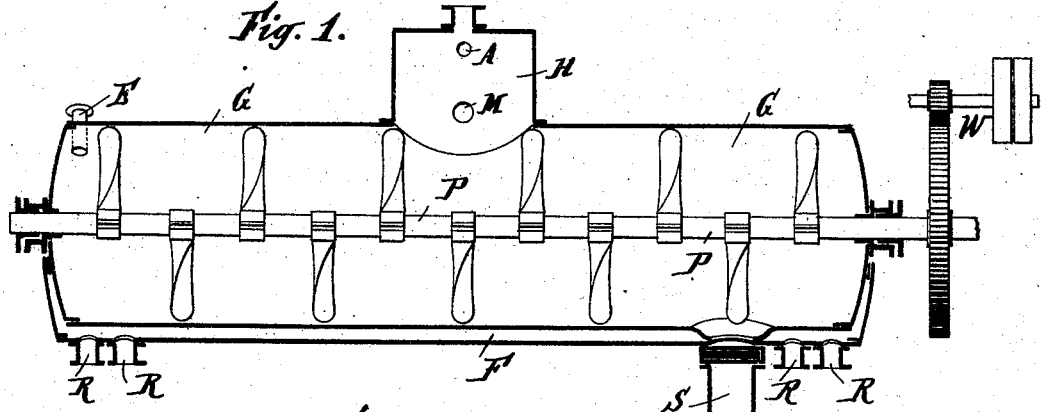
Figure 2:
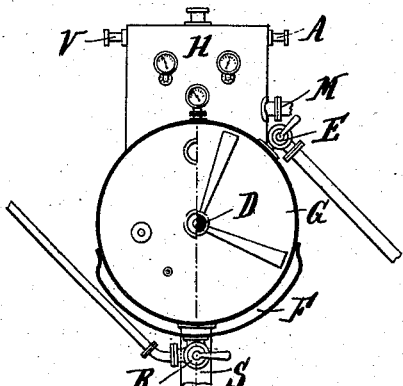

Figure 1 is a longitudinal sectional view of the mixer into which the molasses is received from the vacuum-pan. Fig. 2 is a longitudinal sectional view of the same; and Fig. 3 is a side elevation of the apparatus including the vacuum-pan and the centrifugal, with the mixer shown in Fig. 1 in position.

The mixer G is preferably in the shape of a cylindrical boiler, as shown in the drawings, and is provided around its lower portion with a steam-jacket F, furnished with feed and discharge pipes R R for circulating steam through the jacket and for removal of water condensation therefrom. The mixer is also provided with a central shaft P, passing through stuffing-boxes B in the ends of the mixer, and provided at one end with gears W, by means of which the shaft P is rotated. The shaft P is provided at intervals throughout its length with agitators K, by means of which the masse contained in the mixer is mixed and rendered homogeneous and the steam vesicles formed during the heating of the masse are brought to the surface. A connection E is provided at one end of the mixer, by which it is connected to a vacuum-pan C. A discharge-pipe S is provided in the bottom of the mixer, through which its contents may be discharged, the discharge-pipe being connected with a centrifugal T, as shown in Fig. 3. At the top of the mixer is provided a steam-chest H to facilitate quiet evaporation *in vacuo* at a low temperature, the steam-chest being provided for this purpose with a pipe V, leading to an exhaust-pump. In the steam-chest is also provided a connection A, leading to a pump for forcing compressed air into the mixer, by means of which the contents of the mixer may be discharged. At the bottom of the steam-chest H is provided a pipe M for the introduction of diluted molasses or water for the purposes hereinafter disclosed.

Figure 3:
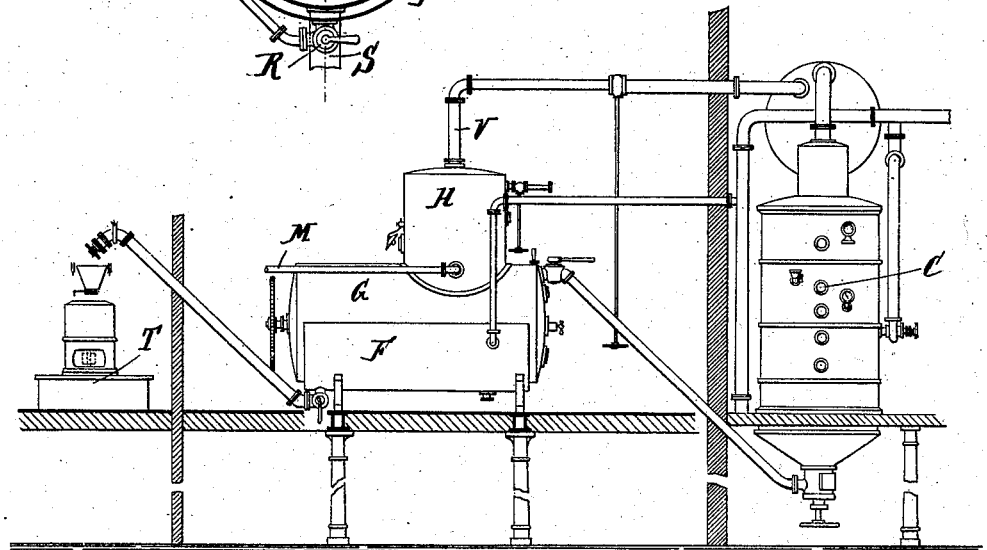

By the arrangement of the apparatus as shown in Fig. 3 and by the use of the pump no attention need be paid to the position or height of the apparatus, so that the latter may be placed at the most convenient spot between the vacuum-pan and the centrifugal. The arrangement is preferably such that the masse-cuite issuing from the vacuum-pan, as well as the masse issuing from the mixer, will follow an upward course, this latter being favorable to thorough mixing or transfusion of the masse, and also allowing the whole apparatus to be arranged on the same floor of the factory, as shown in Fig. 3 of the drawings.

The process forming the subject-matter of the present invention is performed as follows: The masse-cuite is discharged from the vacuum-pan C through the ascending connection through the pipe E into the mixer, where is added a quantity of water or dilute molasses. The molasses which I preferably employ for diluting the masse-cuite in the mixer consists of the sugar which is deposited when the molasses is obtained from the first crystallization when the latter has been allowed to remain at rest for a long time, this sugar being obtained by the decantation of the pure liquid molasses, which floats on the top. This sugar is then diluted with water until its sugar content is very low and the solution capable of dissolving the fine crystals which exist in the masse-cuite and which it is the intention of the inventor to dissolve when the masse-cuite leaves the vacuum-pan and is introduced into the mixer. The weak sugar solution or molasses added to the masse-cuite in the mixer effects the solution not only of all the fine crystals and sugar-flour present therein, but also of the molasses accompanying the masse-cuite, and under the influence of heat and the action of the agitators the whole is formed into a homogeneous mixture.

The treatment in the mixer is continued until the masse is concentrated *in vacuo* to a suitable condition to be subjected to treatment in the centrifugal. The masse is then discharged from the mixer through the connection S into the centrifugal T.

The sugar employed for making the dilute solution or molasses referred to above is obtained in the ordinary process of sugar-making, wherein the waste molasses from the first crystallization or the first molasses coming from the centrifugal is submitted to a slight evaporation and then introduced into the vats in which sugar of the second crystallization is received. Under these conditions the residual sugar or sugar-flour, which settles at the bottom after the second day, increases, until after a period of from ten to fourteen days this deposit reaches a height of one meter. The molasses at the top covering the sugar deposit has grown gradually poor, and when its strength has diminished to about 68° the clear molasses at the top is decanted into the vats of the third molasses or third crystallization. The sugar deposit, consisting of microcrystals, is then diluted by dissolving in warm water to form a sugar-molasses of the concentration of about 60° Brix. It is this diluted sugar-molasses which is employed in the mixer for treating the masse-cuite, as above described.

Instead of using a very dilute sugar-molasses, as above described, water may be used to recover the sugar from the first molasses, but the result obtained is less advantageous and less economical, since there occurs too great a loss—that is to say, by the use of water too many of the larger crystals present in the masse-cuite are dissolved, and it is for the purpose of avoiding this solution of the larger sugar-crystals that the dilute sugar-molasses above described is used in place of water, the object being not to dissolve the larger sugar-crystals already separated from the masse-cuite, but only the finer crystals and sugar-flour. It is evident that if the larger crystals be redissolved as by the use of pure water instead of a weak sugar-molasses that part of the work of crystallization is done over again. Water is therefore to be considered as an equivalent of the term "dilute molasses" used in appended claim one.

I claim—

1. A process for recovery of sugar from masse-cuite consisting in mixing the masse-cuite outside of the vacuum-pan with the addition of dilute molasses, so as to cause solution of the microcrystalline sugar, but not the larger crystals in the masse-cuite, and evaporating and concentrating *in vacuo* the product to cause deposition on the larger crystals, thereby adding to the size of the latter at the expense of the microcrystalline sugar in the mass.

2. A process for the recovery of sugar from masse-cuite, consisting in mixing the masse-cuite outside of the vacuum-pan with the addition of dilute waste molasses of the first jet, after crystallization of residual sugar therefrom so as to cause solution of the microcrystalline sugar but not the larger crystals in the masse-cuite, and evaporating and concentrating *in vacuo* the product to cause deposition of sugar on the larger crystals, thereby adding to the size of the latter at the expense of the microcrystalline sugar in the mass.

WILHELM HUCH.

Witnesses:
　Aug. Joerissen,
　Gregory Phelan.